No. 757,457. PATENTED APR. 19, 1904.
J. W. HANCOCK.
NUT LOCK.
APPLICATION FILED OCT. 17, 1903.
NO MODEL.
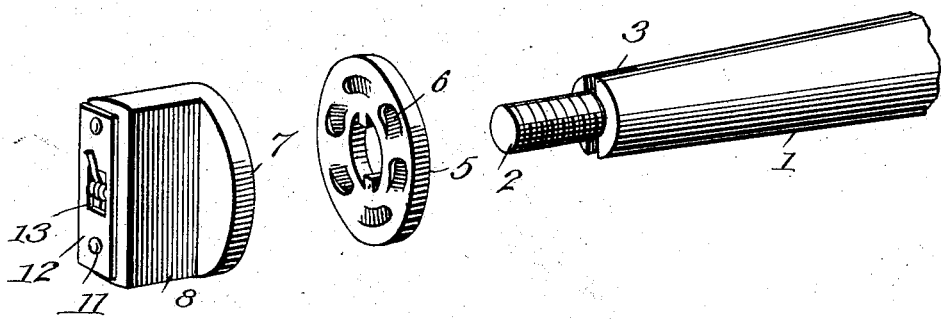
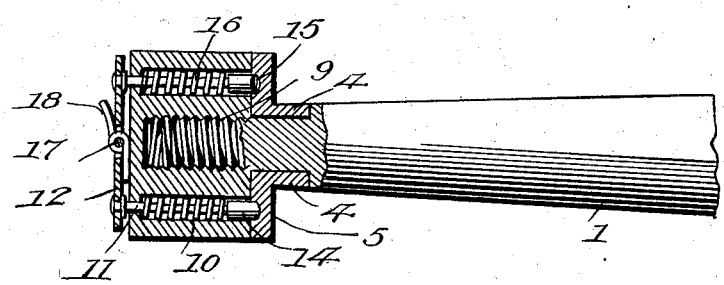
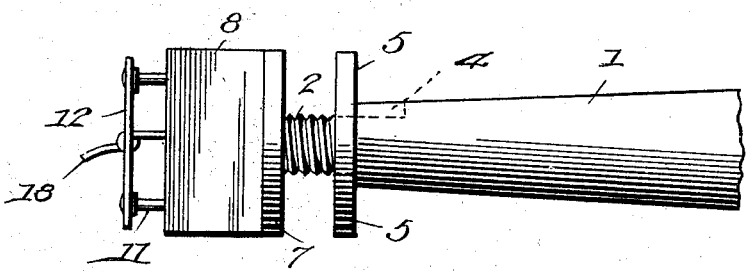
Witnesses
Geo. Ackman Jr.
Herbert D. Lawson
Inventor
John W. Hancock,
By Victor J. Evans
Attorney No. 757,457. Patented April 19, 1904.

UNITED STATES PATENT OFFICE.

JOHN W. HANCOCK, OF MATTOON, ILLINOIS.

NUT-LOCK.

SPECIFICATION forming part of Letters Patent No. 757,457, dated April 19, 1904.

Application filed October 17, 1903. Serial No. 177,469. (No model.)

*To all whom it may concern:*

Be it known that I, JOHN W. HANCOCK, a citizen of the United States, residing at Mattoon, in the county of Coles and State of Illinois, have invented new and useful Improvements in Nut-Locks, of which the following is a specification.

My invention relates to new and useful improvements in nut-locks especially adapted for use upon running-gear of vehicles. Its object is to provide a nut of simple construction which is adapted to automatically lock when screwed into position, but which can be readily unlocked when it is desired to detach the nut.

With the above and other objects in view the invention consists in providing a washer having a series of recesses in its outer face and also provided with tongues adapted to engage the object from which the stem to be engaged by the nut projects. The nut is formed of a disk having an integral casing thereon provided with a recess for the reception of the screw, and spring-pressed plungers are mounted within the casing and are adapted to automatically engage the recesses in the washer. Means are provided for retracting the plungers from engagement with the recesses when it is desired to remove the nut.

The invention also consists in the further novel construction and combination of parts hereinafter more fully described and claimed, and illustrated in the accompanying drawings, showing the preferred form of my invention, and in which—

Figure 1 is a perspective view of the nut-lock, showing the several parts detached. Fig. 2 is a section therethrough, showing the parts assembled; and Fig. 3 is a side elevation showing the nut unlocked and the plungers retracted thereinto.

Referring to the figures by numerals of reference, 1 is the axle of a vehicle and is provided with a screw-threaded stem 2, and at opposite sides of this stem and within the axle are formed recesses 3. These recesses are adapted to receive tongues 4, extending from the inner face of a washer 5, and this washer is adapted to inclose the stem 2 and is provided with a series of recesses 6 in its outer face, each of said recesses having its inner face inclined toward one end. The nut used in connection with the above parts is formed of a disk 7, having a casing 8 formed integral with one face thereof, said casing being preferably rectangular in form. A recess 9 is provided in the center of the disk and the casing and is adapted to receive the stem 2, the walls of said recess being screw-threaded to engage said stem. Recesses 10 are also formed within the disk and the casing at opposite sides of the recess 9, and in the recesses are slidably-mounted rods 11, which project from the outer face of the casing 8 and are connected by a plate 12, having an aperture 13 at the center thereof. Pawls 14 are secured to the inner ends of plungers 11, and their ends are beveled, as shown at 15, so as to permit them to be readily moved backward out of the recesses 6. Coiled springs 16 are arranged within recesses 10 and inclose the plungers 11, and these springs serve to hold the plungers normally projected from one face of the nut. A cross-pin 17 is arranged within the aperture 13 in plate 12 and serves as a pivot-pin for a lever 18, one end of which normally bears upon the outer face of the nut, while the other end forms a handle for operating the same.

In assembling the parts herein described the washer 5 is placed upon the stem 2, with the tongues 4 within the recesses 3. The nut is then placed upon the stem and screwed thereon, so as to bring the pawls 14 in contact with washer 5. These pawls will readily slip over the recesses 6, because the far ends of said recesses are inclined and serve to guide the pawls outwardly. After the nut has been placed in position it cannot be unscrewed, because the pawls will engage the other ends of the recesses and prevent the rotation of the nut. The only way to remove the nut after it has once been locked is to draw the handle of lever 18 outward, and thereby cause the other end of said lever to bear on the nut and force the plate 12 away from it. This movement of the plate will draw the plungers 11 within the recesses 10 and contract the springs 16. The pawls will thus be retracted, as shown in Fig. 3, and the nut can be readily unscrewed. When the lever is released, the springs will return the parts to their normal positions. If desired, the washer 5 may be dispensed with and the nut placed in engagement with recesses which can be formed in the shoulder of the axle.

In the foregoing description I have shown the preferred form of my invention, but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a nut-lock, the combination with a washer having recesses therein, and means for preventing the rotation of the washer; of a nut having a threaded recess therein, spring-pressed pawls slidably mounted within the nut and adapted to engage the washer, and means for simultaneously retracting the pawls.

2. In a nut-lock, the combination with a recessed washer, and means for preventing the rotation thereof; of a nut having a screw-threaded recess therein, spring-pressed pawls slidably mounted within the nut, a plate connecting the pawls, and a lever operating the plate and pawls.

3. In a nut-lock, the combination with a recessed washer, and means for preventing the rotation thereof; of a nut having a screw-threaded recess therein, pawls slidably mounted within the nut and adapted to engage the recesses, plungers slidably mounted within the nut and connected to the pawls, springs inclosing the plungers and bearing on the pawls, a plate connecting the plungers, and means upon the plate for moving the same from the nut.

In testimony whereof I affix my signature in presence of two witnesses.

JOHN W. HANCOCK.

Witnesses:
   D. M. LINTNER,
   JOHN H. TIVNEN.